(12) United States Patent
Kelekar (10) Patent No.: US 11,604,395 B2
(45) Date of Patent: Mar. 14, 2023

(54) AIRBORNE-CHARGE RECEIVING LAYER

(71) Applicant: Hewlett-Packard Development Company, L.P., Spring, TX (US)

(72) Inventor: Rajesh Kelekar, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 136 days.

(21) Appl. No.: 16/612,780

(22) PCT Filed: Dec. 14, 2017

(86) PCT No.: PCT/US2017/066378
§ 371 (c)(1),
(2) Date: Nov. 12, 2019

(87) PCT Pub. No.: WO2019/117915
PCT Pub. Date: Jun. 20, 2019

(65) Prior Publication Data
US 2020/0301237 A1   Sep. 24, 2020

(51) Int. Cl.
*G02F 1/1675* (2019.01)
*G02F 1/167* (2019.01)

(52) U.S. Cl.
CPC ............ *G02F 1/1675* (2019.01); *G02F 1/167* (2013.01)

(58) Field of Classification Search
CPC .................. G02F 1/167; G02F 1/16757; G02F 1/133348; G02F 1/16756; G02F 2201/42; G02F 1/1675; G02F 1/1676; G02F 1/16755; G02F 1/1681; G02F 2001/1678; G02F 2201/50; G02F 2202/28; G02F 1/133311; G02F 1/133342; G02F 2201/501; G02F 1/1671; G02F 1/1679; G02F 1/1685; G03G 9/0819; G03G 9/0825; G03G 9/0827; G03G 9/0836; G03G 9/0837; G03G 9/0838; G03G 9/08782; G03G 2215/022; G03G 9/083; G03G 9/0833; G03G 9/0835; G03G 9/08708; G03G 13/09; G03G 15/553; G03G 15/556; G03G 2215/021; G03G 9/08; G03G 9/0821; G03G 9/0834; G03G 9/08711; G03G 9/08722; G03G 9/08771;
(Continued)

(56) References Cited

U.S. PATENT DOCUMENTS 7,550,101 B2   6/2009   Yang et al.
7,671,834 B2   3/2010   Sprague
(Continued)

FOREIGN PATENT DOCUMENTS

WO   WO 2015/163907   * 10/2015   ............. G02F 1/167
WO   WO-2015163907 A1   10/2015

OTHER PUBLICATIONS

Cho, Won-Ki et al. "Development of Reflective Paper-like Display with Triboelectrically Charged-polymer Particles" Journal of Information Display 6, No. 3 (2005): 30-35.

*Primary Examiner* — Brandi N Thomas
(74) *Attorney, Agent, or Firm* — Michael Dryja (57) ABSTRACT

An airborne-charge receiving layer of a passive electronic paper assembly comprises a first side and opposite second side to be in contact with a charge-responsive media layer. The airborne-charge receiving layer comprises a first material to minimize triboelectric charge transfer at an external surface of the first side of the airborne-charge receiving layer.

15 Claims, 7 Drawing Sheets (58) Field of Classification Search
CPC ........... G03G 9/08791; G03G 9/09708; G03G 9/09716; G03G 9/09725; G03G 15/167; G03G 15/325; G03G 15/6597; G03G 21/0064; G03G 2215/0609; G03G 9/097
See application file for complete search history.

(56) References Cited

U.S. PATENT DOCUMENTS

| | | |
|---|---|---|
| 2004/0252360 A1 | 12/2004 | Webber et al. |
| 2015/0129286 A1 | 5/2015 | Srinivas et al. |
| 2016/0342062 A1 | 11/2016 | Birecki et al. |
| 2016/0342064 A1 | 11/2016 | Gila et al. |
| 2017/0052421 A1 | 2/2017 | Chun et al. |
| 2017/0205626 A1 | 7/2017 | Shao et al. |

* cited by examiner

AIRBORNE-CHARGE RECEIVING LAYER

BACKGROUND

Electronic paper ("e-paper") is a display technology designed to recreate the appearance of ink on ordinary paper. Some examples of e-paper reflect light like ordinary paper and may be capable of displaying text and images. Some e-paper may be implemented as a flexible, thin sheet, like paper. One familiar e-paper implementation includes e-readers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to minimizing triboelectric charge transfer at an airborne-charge receiving layer, which in turn may minimize unintentional switching of color particles in a charge-responsive media layer of an electrically passive electronic paper (e-paper) assembly. Via such arrangements, image quality of the e-paper assembly may be preserved despite regular handling, such as finger swiping across an external surface of the airborne-charge receiving layer and/or other ways in which an external object may be in sliding contact with the external surface of the airborne-charge receiving layer of the e-paper assembly. Stated differently, via such reduction of unwanted triboelectric charge transfer via at least some examples of the present disclosure, one may avoid streaks, smears, etc. that might otherwise extend across and hinder readability of a viewable image of the passive e-paper assembly.

In some examples, an electrically passive e-paper assembly comprises a charge-responsive media layer and an airborne-charge receiving layer. The charge-responsive media layer includes a first side and an opposite second side. The airborne-charge receiving layer includes a first side and an opposite second side in contact with the first side of the charge-responsive media layer. The airborne-charge receiving layer comprises a first material to minimize triboelectric charge transfer during relative moving contact between an external object and the airborne-charge receiving layer.

These examples, and additional examples, are further described below in association with at least FIGS. 1-13.

Figure 1:
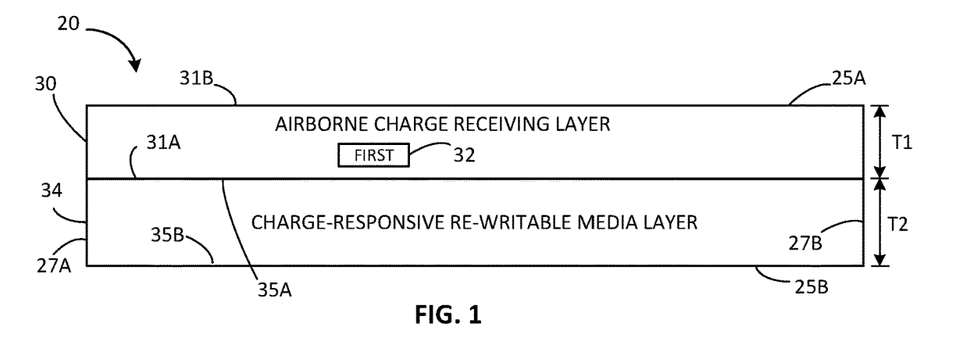
FIG. 1 is a side view schematically representing an airborne-charge receiving layer of an example passive e-paper assembly.

FIG. 1 is a side view schematically representing an example passive e-paper assembly 20. In some examples, the e-paper assembly 20 may sometimes be referred to as an e-paper display assembly, e-paper display media, and/or e-paper display device. Moreover, in some examples, e-paper assembly 20 may form part of a larger e-paper display media or display device as shown later in association with at least FIGS. 10-12.

As shown in FIG. 1, in some examples the passive e-paper assembly 20 comprises a charge-responsive, re-writable media layer 34 including a first side 35A and an opposite second side 35B. This layer 34 may sometimes be referred to as a charge-responsive imageable layer. An airborne-charge receiving layer 30 is disposed on the first side 35A of the charge-responsive media layer 34, and includes a first side 31B and opposite second side 31A. In some instances, the airborne-charge receiving layer 30 may sometimes be referred to as a coating. In one aspect, the e-paper assembly 20 comprises opposite sides 27A, 27B, and opposite faces 25A, 25B.

It will be understood that, even in the absence of airborne-charge receiving layer 30, charge-responsive media layer 34 would be imageable by airborne charges and that layer 30 may be provided at least for protection against unintentional and/or malicious mechanical and electrical insults to charge-responsive media layer 34. Nevertheless, in at least some examples of the present disclosure, the presence of the airborne-charge receiving layer 30 facilitates producing and retaining quality images at charge-responsive media layer 34 in the manner described herein. In some examples, and as further described below, at least airborne-charge receiving layer 30 may comprise an anisotropic structure to facilitate the migration of charges (e.g. written by an imager unit 310 in FIG. 10) on charge-responsive media layer 34.

In some examples, the thickness and type of materials forming airborne-charge receiving layer 30 are selected to mechanically protect at least the charge-responsive media layer 34 (including microcapsules 308 shown in FIG. 10) from punctures, abrasion, bending, scratching, liquid hazards, crushing, and other impacts.

Moreover, in some examples the airborne-charge receiving layer 30 also may protect the charge-responsive media layer 34 from triboelectric charges. For instance, as shown in FIG. 1, the airborne-charge receiving layer 30 comprises a first material 32 which causes at least a portion of the airborne-charge receiving layer 30 to minimize triboelectric charge transfer (associated with external objects), which in turn, may minimize unintentional switching of color particles in the charge-responsive media layer 34, as further described below.

In some examples, the entire passive e-paper assembly 20 is flexible by virtue of each layer 30, 34 being relative thin and highly flexible.

In some examples, referring to the e-paper assembly 20 as being passive means that the e-paper assembly 20 is electrically passive, i.e. has no active electrode plates, electrode layers, drive electrodes, driving circuits, etc. to cause a change in the image (e.g. information) displayed in the re-writable media layer 34. Instead, any change in the image displayed is caused by an external imaging unit, such as but not limited to, the imaging unit described later in association with at least FIG. 10. Moreover, the e-paper assembly 20 can be relatively, thin and light because its lacks an on-board power supply.

Charge-responsive media layer 34 includes components which switch color (e.g. black, white, etc.) such as when airborne electrical charges are applied to airborne-charge receiving layer 30, which permits migration of such electrical charges to the charge-responsive media layer 34. In some examples, the charge-responsive media layer 34 comprises a switchable pigment or die combination. One example of such a charge-responsive media layer 34 (in a passive e-paper assembly) is described later in association with at least FIG. 10. In some examples, the charge-responsive, re-writable media layer 34 comprises a thickness (T2) between about 20 microns and about 100 microns.

Figure 2:
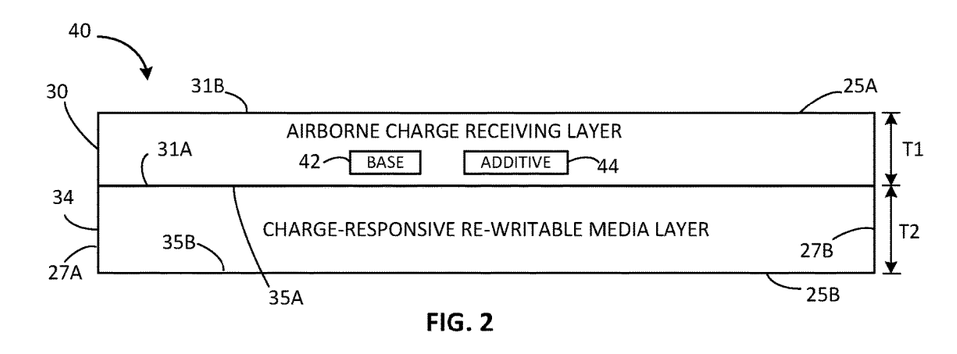
FIG. 2 is a side view schematically representing an airborne-charge receiving layer of an example passive e-paper assembly.

In some examples, the first material 32 comprises an additive material 44 which is combined with a base material 42, as further described in association with at least FIG. 2. In some such examples, the additive material 44 is added in a volume relative to the base material 42 which avoids substantially altering properties of the base material 125 to facilitate reception onto, and migration of airborne charges, through airborne-charge receiving layer 30 to the charge-responsive media layer 34. In some examples, these properties may comprise flexibility, charge dissipation, and/or print quality. In some examples, avoiding a substantial alteration (i.e. maintaining a desired property) in flexibility comprises implementing a radius of curvature, at which mechanical failure is observed, to be less than 50 mm. In some examples, such mechanical failure may comprise cracking, buckling, and/or delamination of at least some portions of the airborne-charge receiving layer 30 and/or of the entire e-paper assembly 20. In some examples, avoiding a substantial alteration (i.e. maintaining a desired property) in charge dissipation comprises providing for charge dissipation in which a surface charge observed after imaging should be less than 50 Volts. In some examples, avoiding a substantial alteration (i.e. maintaining a desired property) in print quality corresponds to an image on the charge-responsive media layer 34 of a standard bar code or QR code being readable by a barcode scanner.

With these properties in mind, in at least some examples in which the first material 32 is an additive material, the additive material 44 comprises no more than 5 percent volume of a total volume of the material forming the airborne-charge-receiving layer 30. In some such examples, this relationship is implemented in order to avoid substantial alteration of various properties (e.g. flexibility, charge dissipation, print quality, etc. as described above) of the airborne-charge receiving layer 30.

As previously noted, the additive material 44 may minimize triboelectric charge transfer, and thereby may minimize triboelectric-induced switching of different color charged particles in the charge-responsive media layer 34.

In some examples, instead of acting as an additive material 44, the first material 32 comprises a majority of the base material 42 forming the airborne-charge receiving layer 30 such that the first material 32 may sometimes be referred to as a base material 42. In some such examples, the first material 32 comprises a silicone material.

In some examples, via the incorporation of a first material 32 within airborne-charge receiving layer 30, the airborne-charge receiving layer 30 may effectively minimize triboelectric charge transfer without application of a lubricant (e.g. pefluoropolyether oils) at an outermost external surface of first side 31B of the airborne-charge receiving layer 30. However, in some examples, such lubricants also may be applied at the external surface of a first side 31B of the airborne-charge receiving layer 30, which incorporates an additive material for reducing triboelectric charge transfer according to examples of the present disclosure.

It will be understood that the volume of additive material 44 which is added may depend at least on a type of material(s) forming a base material 42 composition, a surface roughness of the base material 42, the type of material used as the additive material 44, etc.

With further reference to FIG. 1, in some examples, the airborne-charge receiving layer 30 comprises a thickness (T1) of between about 50 to about 200 microns. In some examples, the airborne-charge receiving layer 30 may comprise an UV curable acrylate, among other materials in addition to the first material 32.

In some examples, besides the additive material 44, the airborne-charge receiving layer 30 also may additionally comprise another material, such as magnetite particles, which is electrically conductive and aligned in order to implement anisotropic properties to facilitate migration of charges toward the charge-responsive media layer 34. Accordingly, in some such examples, the airborne-charge receiving layer 30 may sometimes also be referred to as an anisotropic layer.

FIG. 2 is a side view schematically representing an example passive e-paper assembly 40 comprising at least some of substantially the same features and attributes as the passive e-paper assembly 20 (FIG. 1), with the first material 32 of airborne-charge receiving layer 30 comprising an additive material 44 which may be combined with a base material 42.

At least some examples of such additive materials 44 and/or base materials 42 are further described below in association with at least FIGS. 4A-9.

In some examples, a composition of the base material 42 facilitates intentional reception and migration of airborne charges, emitted by a non-contact ion erasing/writing unit (e.g. FIG. 10), through the airborne-charge receiving layer 30 and into the charge-responsive media layer 34. Various examples of a base material composition are further described below. In some examples, the base material also may facilitate charge dissipation of charges other than those intended to migrate to the charge-responsive media layer 34. In some examples, the base material 42 may comprise a semiconductive material.

Figure 3:
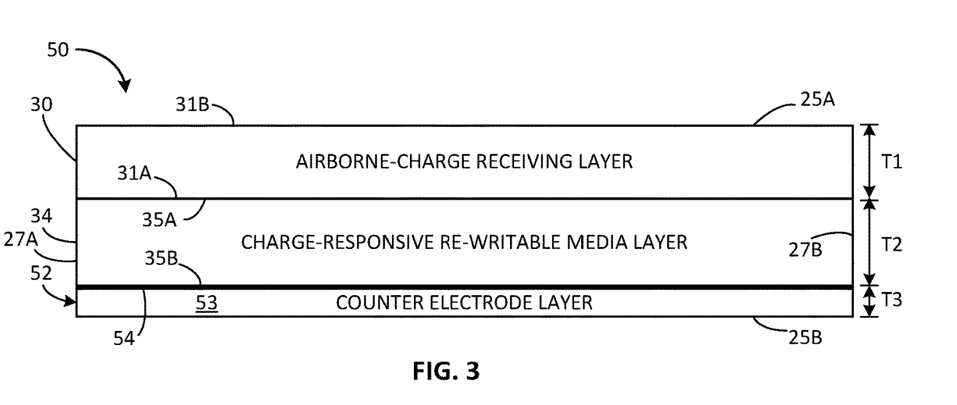
FIG. 3 is a side view schematically representing an example passive e-paper assembly including a counter electrode layer.

FIG. 3 is a side view schematically representing an example passive e-paper assembly 50 comprising at least some of substantially the same features and attributes as the passive e-paper assembly 20, 40 (FIGS. 1, 2), except further comprising a counter electrode layer 52 disposed on a second side 35B of the re-writable media layer 34. In this configuration, an external surface of the counter electrode layer 52 corresponds to an external second side 25B of the entire electronic paper assembly 50.

Figure 10:
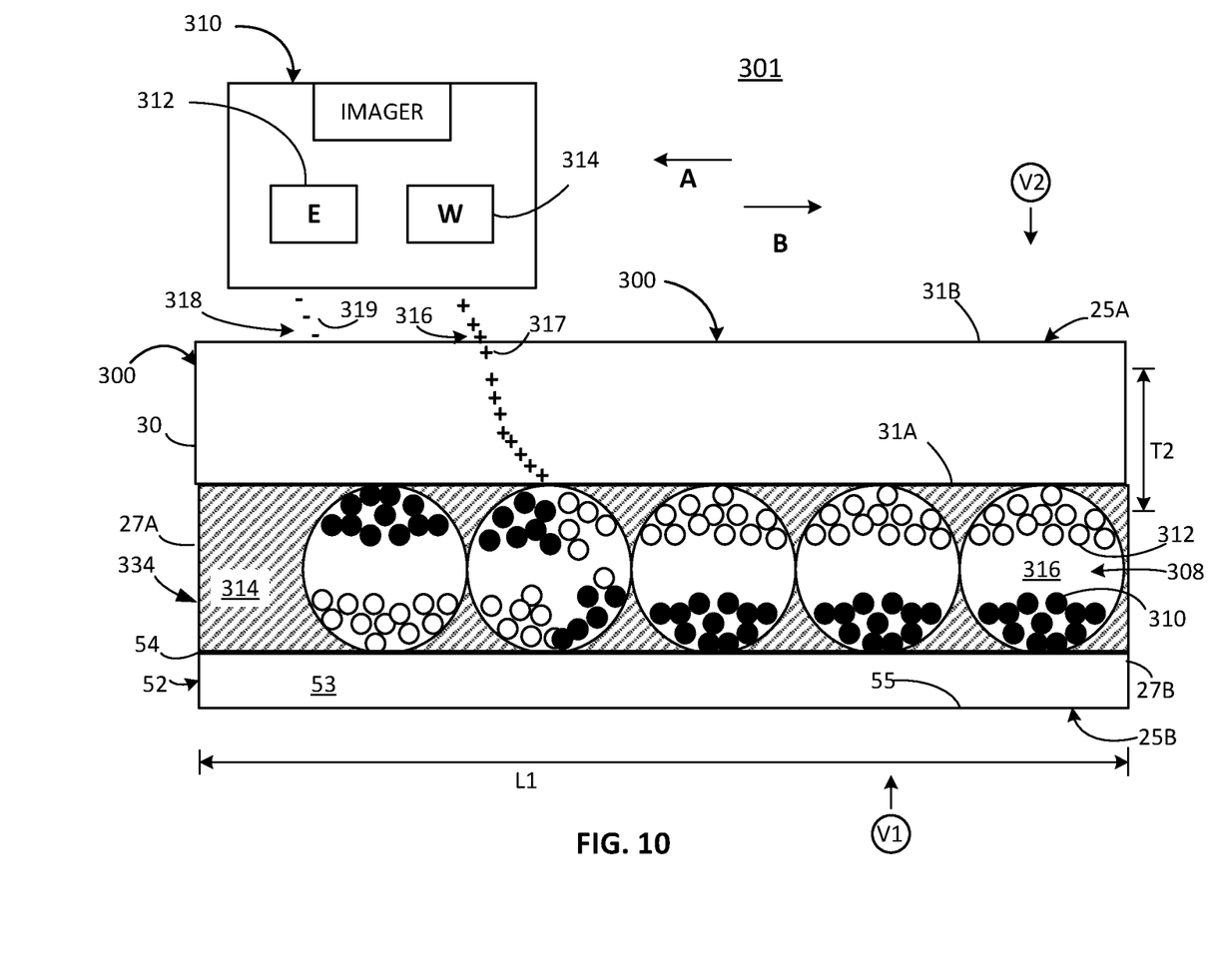
FIG. 10 is a diagram including a partial sectional view schematically representing an example e-paper assembly and a side plan view schematically representing an example imaging unit.

Counter electrode layer 52 provides a counter electrode for the imaging of e-paper display assembly by an imager unit (e.g. 310 in FIG. 10). In some instances, the counter electrode layer 52 may sometimes be referred to as a ground electrode or ground electrode layer. In some examples, the counter electrode layer 52 comprises a distinct conductive element 54 acting as a ground electrode.

With this in mind, the counter electrode layer allows counter charges to flow to the ground electrode from a writing module (e.g. imager unit 310 in FIG. 10). Thus, e-paper assembly 50 (FIG. 3) remains basically charge neutral despite charges being emitted onto airborne-charge receiving layer 30. Without a connection between counter electrode layer 52 and an imager unit (e.g. 310 in FIG. 10), no appreciable amount of charges can be emitted onto charge receiving layer 30 and thus no information can be written to charge-responsive media layer 34.

In some examples, instead of having a distinct conductive element 54 apart from barrier 53, the counter electrode layer 52 may comprise a single element made of transparent conductive material, such as indium tin oxide. In some examples, counter electrode layer 52 may comprise an opaque conductive material, such as when the first side 25A may act as the viewing side of the e-paper display media 50. In one example, counter electrode layer 52 has a thickness (T3) between 5 nanometers and 1 millimeter.

Regardless of the particular manner in which counter electrode layer 52 may implement electrical conductivity to serve as a ground electrode, the counter electrode layer 52 provides a barrier 53 to protect the re-writable media layer 34 from unintentional and/or malicious mechanical and electrical insults to charge-responsive rewritable media layer 34.

Figure 4A:
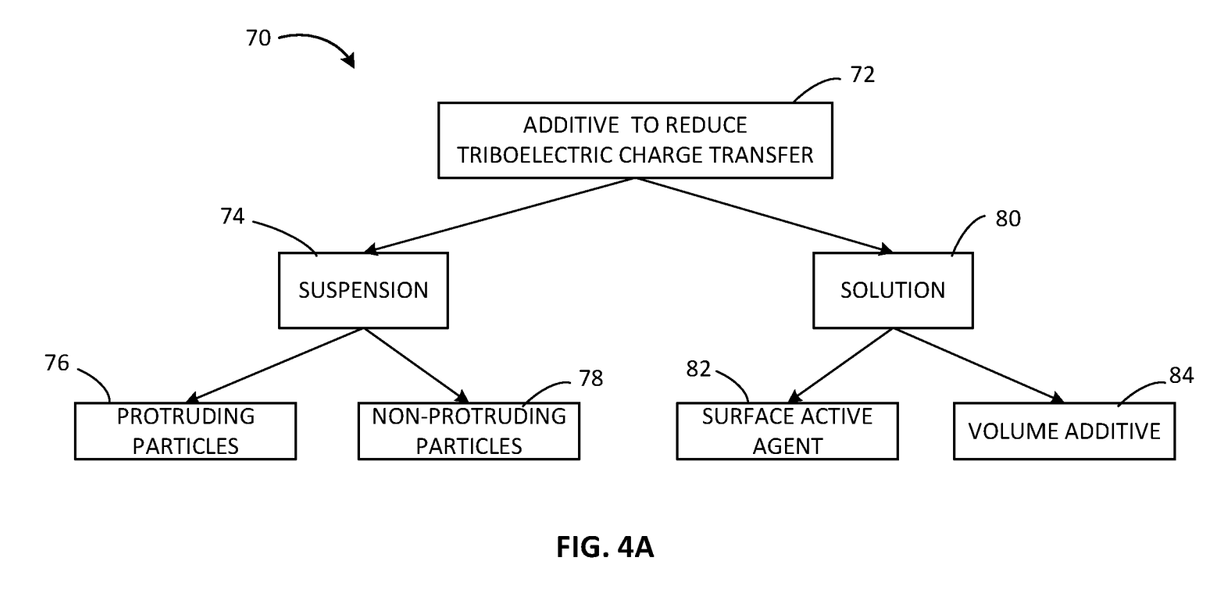
FIG. 4A is a block diagram schematically representing example types of materials for an example airborne-charge receiving layer.

FIG. 4A is a block diagram 70 schematically representing example types of additive materials for an example airborne-charge receiving layer (e.g. 30 in FIGS. 1-3). As shown in FIG. 4A, such additive materials 72 may comprise a suspension 74 or a solution 80. In some examples, the suspension 74 may be exhibited at a particle level, and may be implemented to exhibit protruding particles 76 or non-protruding particles 78. The protruding particles 76 protrude from an external surface (e.g. at 31B) of an airborne-charge receiving layer (e.g. 30), while non-protruding particles 78 correspond to a suspension in which additive particles may be exposed at an external surface (e.g. at 31B) of an airborne-charge receiving layer 30 but which do not generally protrude and/or protrude minimally. In either case, the physical presence of particles 76, 78 at the external surface decreases the overall amount of contact between an external object (e.g. finger) and a base material of an airborne-charge receiving layer (e.g. 30), which in turn reduces triboelectric charge transfer between the external object and the base material of the airborne-charge receiving layer.

At least some examples of a suspension exhibiting protruding particles 76 are further described later in association with at least FIGS. 5A-5B and FIG. 7. At least some examples of a suspension exhibiting generally non-protruding particles 78 are further described later in association with at least FIG. 5C.

In some examples, upon combining an additive material 72 with a base material, a solution 80 is formed in which the overall properties of the airborne-charge receiving layer (e.g. 30) become modified in a manner which reduces triboelectric charge transfer. The solution 80 may reduce triboelectric charge transfer and may comprise a surface active agent 82 in some examples and/or a volume additive 84 in some examples, as further described later in association with at least FIGS. 8-9.

Figure 4B:
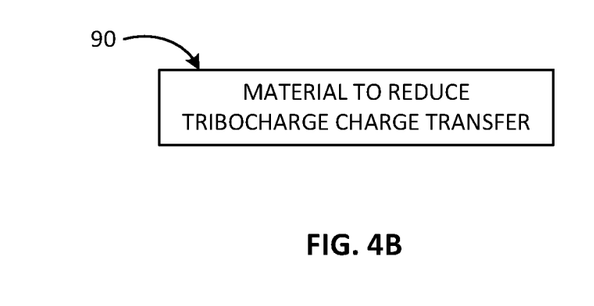
FIG. 4B is a block diagram schematically representing an example type of material for an example airborne-charge receiving layer.

FIG. 4B is a block diagram schematically representing a base material 90 for an example airborne-charge receiving layer. In some examples, the base material 90 does not depend on use of an additive material in a suspension or as a solution to reduce triboelectric charge transfer. Instead, the base material 90 comprises a majority component which already exhibits sufficient triboelectric charge transfer reduction properties. At least some examples of this arrangement are further described later following the description associated with FIG. 9.

Figure 5A:
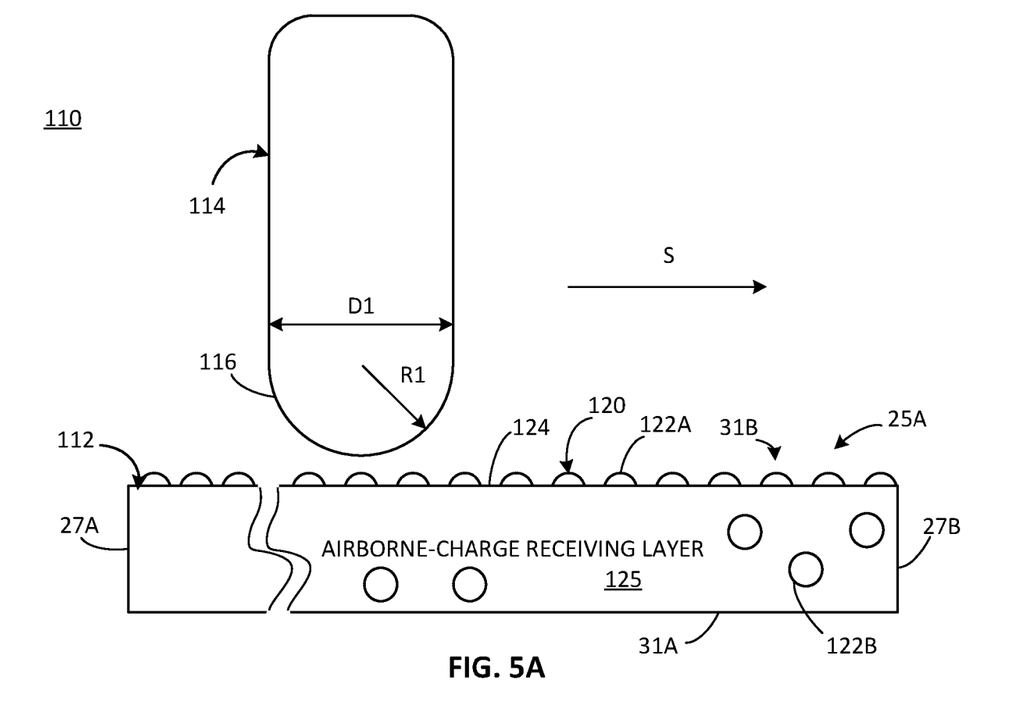
FIG. 5A is a side view schematically representing an external object positioned relative to an example airborne-charge receiving layer.

FIG. 5A is a diagram 110 including a side view schematically representing an example airborne-charge receiving layer 112 and an external object 114. In some examples, the airborne-charge receiving layer 112 comprises at least some of substantially the same features and attributes as the example airborne-charge receiving layers as previously described in association with at least FIGS. 1-3. Accordingly, among other features, the airborne-charge receiving layer 112 may form a portion of an electrically passive electronic paper assembly.

In general terms, the airborne-charge receiving layer 112 shown in FIG. 5A comprises an additive material (e.g. 44 in FIG. 2) to reduce triboelectric charge transfer relative to an external object 114, and which may take the form of particles 122A, 122B which form a suspension (at a particle level) within the base material 125. In some examples, some of the particles 122A of the additive material protrude from an external surface 124 of base material 125 on the first side 31B of the airborne-charge-receiving layer 112.

In some examples, the particles 122A, 122B of the additive material 120 comprise an at least partially spherical shape. In some examples, at least some of the particles 142A of the additive material 120 comprise other shapes, such as but not limited to an elongate fiber shape, as later shown in FIG. 7.

As further shown in FIG. 5A, in some examples, an external object 114 may come into contact against the airborne-charge receiving layer 112, such as when the external surface 114 makes lateral sliding contact across the exposed surface on first side 31B of the airborne-charge receiving layer 112, as represented via directional arrow S. In some examples, the external object 114 may comprise a finger, a stylus, etc. capable of triboelectric charge transfer relative to the airborne-charge receiving layer 112. In one aspect, some such external objects 114 have affinity for electrons from other objects, which may be available from the external surface 124 of the airborne-charge receiving layer 112. One manner of at least partially characterizing such affinity comprises the triboelectric series known to those skilled in the art, and in which various materials are listed in order of polarity of charge separation when touched by another object. The relative placement on the triboelectric series of two different materials may be at least partially indicative of the likelihood and/or amount of charge which is transferrable. In at least some such triboelectric series, human skin is listed relatively high in the triboelectric series as being relatively high positively charged.

Accordingly, the addition of an additive material and/or modification of a base material of an airborne-charge receiving layer 112, according to at least some examples of the present disclosure, can alter the placement of at least the external surface of the airborne-charge receiving layer 112 on the triboelectric series to thereby reduce the likelihood and/or amount of charge transferred between an external object, such as a finger or other object, and the airborne-charge receiving layer 112.

In some examples, the external object 114 comprises a surface of a container in which a passive e-paper assembly is removably inserted. For instance, the external object 114 may comprise at least a portion of a billfold, sleeve, or other container in which a passive e-paper assembly may be stored. Accordingly, an external object which may potentially cause triboelectric charge transfer may not necessarily have a shape or size as shown in the example of FIG. 5A.

In some examples, the external object 114 is non-electrically-active, i.e. electrically passive. In some such examples, the external object 114 does not carry an active or stored charge or voltage. In some such examples, at least some of the time a finger of a user may be considered electrically passive. Accordingly, in such examples, the airborne-charge receiving layer 112 acts to minimize or inhibit a potential switching of color particles in the charge-responsive media layer caused by a triboelectric-induced charge transfer.

As shown in FIG. 5A, the external object 114 may have a width D1. In some such examples, the external object 114 may comprise an arcuate shaped tip 116, which may have a radius of curvature R1. In some examples, the radius of curvature R1 is greater than a distance G1 (FIG. 5B) between adjacent protrusions 122A of external surface on first side 31B of airborne-charge receiving layer 112 such that the size and/or spacing of adjacent protrusions 122A prevent the tip 116 of external object 114 from contacting the external surface 124 of the base material 125 of the airborne-charge receiving layer 112. At least some features of such protrusions 122A are further described in association with FIG. 5B.

Via this arrangement, the protrusions 122A prevent triboelectric charge transfer between the external object 114 and the external surface 124 of the base material 125 because the size and/or relatively close spacing of the protrusions 122A prevent or substantially minimize any possible chemical adhesion between the external object 114 and the external surface 124 of the base material 125.

Figure 5B:
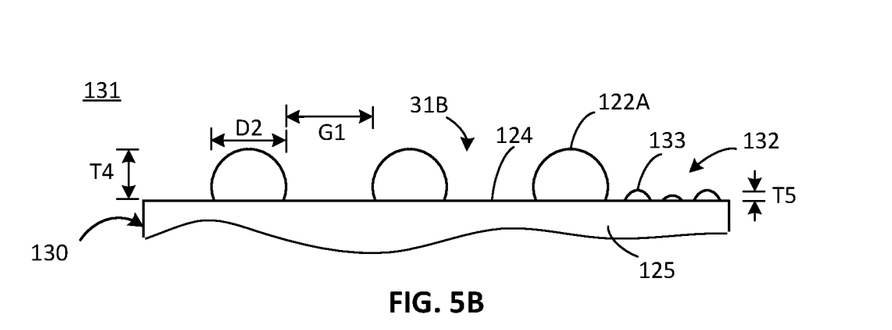
FIG. 5B is an enlarged side view schematically representing an external surface portion of an example airborne-charge receiving layer.

FIG. 5B is a diagram 131 including an enlarged partial side view schematically representing an example airborne-charge receiving layer 130 comprising at least some of substantially the same features as the previously described example airborne-charge receiving layer 112. It will be understood that, for illustrative purposes, the enlarged partial side view in FIG. 5 may represent an exaggeration of the extent to which the protrusions 122A extend outwardly from external surface 124 of base material 125 in order to facilitate representation of relative sizes and spacing of the protrusions 122A. As shown in FIG. 5B, the protrusions 122A have a diameter D2 and a thickness T4. In some examples, the protrusions 122A have an average particle size (e.g. diameter, diameter, longest dimension, etc.) which is on the order of single microns. In some examples, the indicator T4 may represent an average thickness to the extent that the protruding particles 122A may protrude by varying amounts in some examples.

In some examples, the surface roughness 133 of the external surface 124 of the base material 125 has an average thickness T5. In some examples, the surface roughness 133 generally corresponds to the topology of the base material 125 in the absence of an additive material 120 and which may vary depending upon the particular material composition of the base material 125, method of formation, etc.

In some examples, the thickness T4 and/or diameter D2 of protrusions 122A is at least 25 percent greater than the average thickness T5 of the native surface roughness 133 of external surface 124 of base material 125. In some examples, the thickness T4 and/or diameter D2 of protrusions 122A is at least 50 percent greater than the average thickness T5. In some examples, the thickness T4 and/or diameter D2 is at least 100 percent greater than the average thickness T5. In some examples, the thickness T4 and/or diameter D2 is at least 200 percent greater than the average thickness T5.

In some examples, the protrusions 122A of additive material 120 are spaced apart by a distance G1 as shown in FIG. 5B in which the gap between adjacent protrusions is less than a smallest dimension of an external object 114 in contact against the protrusions 122A on first side 31B of airborne-charge receiving layer 112. Via this arrangement, chemical adhesion contact is prevented and/or minimized between the external object 114 and the external surface 124 of the base material 125 of the airborne-charge receiving layer 112.

Figure 5C:
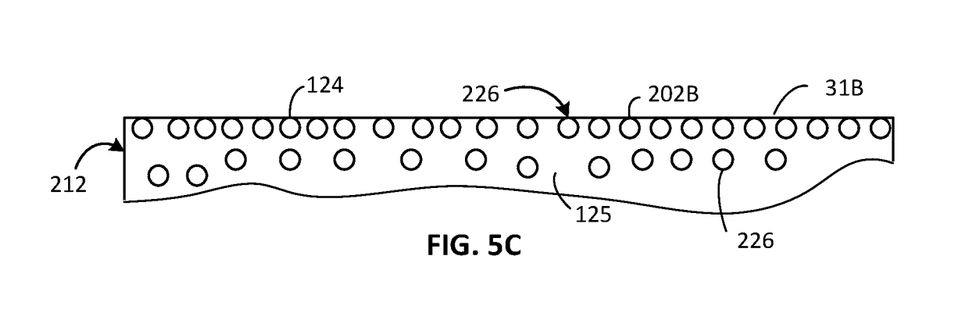
FIG. 5C is a side sectional view schematically representing an external surface portion of an example airborne-charge receiving layer.
Figure 6:
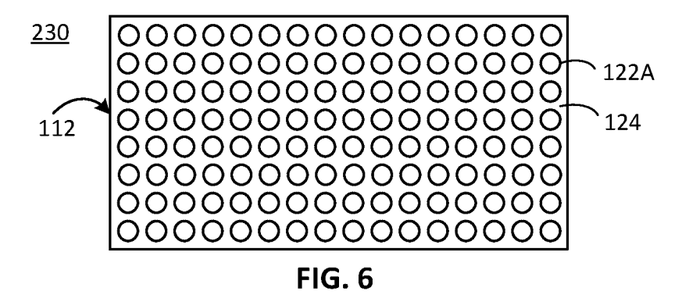
FIG. 6 is a top plan view schematically representing an external surface of an example airborne-charge receiving layer.

While the particles in FIGS. 5A-5B or FIG. 5C may form any one of a variety of uniform or non-uniform patterns on the first side 31B of airborne-charge receiving layer 112, in some examples the particles may be arranged in a relatively uniformly spaced apart pattern as shown in the diagram 230 of a top plan view of an airborne-charge receiving layer 112 in FIG. 6.

FIG. 5C is a partial sectional view schematically representing an example airborne-charge receiving layer 212, which comprises as least some of substantially the same features and attributes as at least previously described airborne-charge receiving layers (e.g. 112, 130) comprising a suspension of additive materials except comprising particles 226 which do not protrude and/or protrude minimally relative to external surface 124 of base material 125. As shown in FIG. 5C, via this arrangement a substantial number of particles 226 are exposed at external surface 124. In such examples, while particles 226 generally do not protrude, their exposure at external surface 124 effectively reduces the volume of base material 125 which may come into contact with an external object 114, and therefore reduces the overall triboelectric charge transfer between the external object 114 and the base material 125. Accordingly, with exposed particles 226 comprising a sufficient density at external surface 124, triboelectric charge transfer relative is substantially minimized or eliminated between an external object 114 and airborne-charge receiving layer 212, which in turn reduces or eliminates unintentional switching of color particles in a charge-responsive media layer (e.g. 34 in FIGS. 1-3, 334 in FIG. 10).

Figure 7:
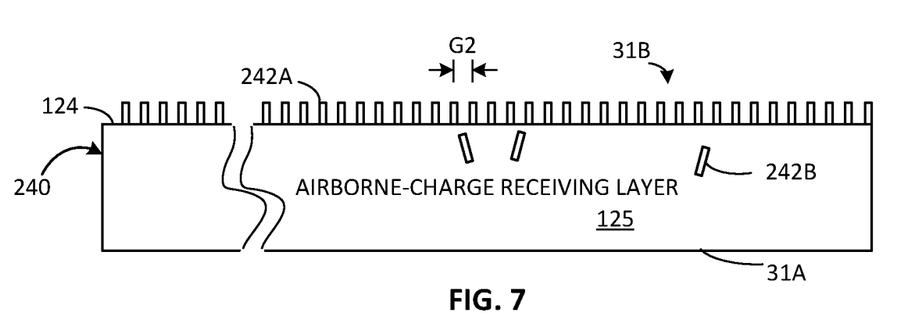
FIGS. 7-9 are each a side view schematically representing a respective example airborne-charge receiving layer.

FIG. 7 is a side view schematically representing an example airborne-charge receiving layer 240, which comprises as least some of substantially the same features and attributes as previously described airborne-charge receiving layers comprising a suspension of particles except with the additive particles 242A, 242B comprising an elongate fiber shape. As shown in FIG. 7, in some examples an additive material in the form of elongate particles 242A may protrude from external surface 124 of base material 125 with at least some particles 242B present within the interior of the layer 240.

In some examples, the protruding elongate particles 242A may comprise magnetite materials suitable to be aligned in parallel via the presence of a magnetic field during the formation of the airborne-charge receiving layer 240. As shown via FIG. 7, a distance G2 between adjacent particles 242A sets a gap smaller than a smallest dimension of an external object 114 (FIG. 4) such that the plurality of protruding particles act as a barrier to prevent chemical contact adhesion between the external object 114 and the external surface 124 of the base material 125.

It will be understood that in some examples, some of the protrusions 122A, 242A (i.e. protruding particles) may periodically break off over an extended period of time from repeated use of the e-paper assembly 20. It will be understood that in such examples, a sufficiently high number and/or density of protrusions 122A, 242A are stably anchored and populated on external surface 124 in a generally permanent manner, such that the remaining protrusions 122A may retain their overall effect as a physical barrier to prevent chemical adhesion contact between an external object (e.g. 114 in FIG. 5A) and the external surface 124 of base material 125 despite the loss of some particles 122A.

With further reference to the example airborne-charge receiving layers 112 in FIGS. 5A-5B, 212 in FIG. 5C, and 240 in FIG. 7 comprising a suspension (e.g. 74 in FIG. 4A), the additive material may comprise a wax, micronized particles, and/or other materials. In some such examples, the additive particles (e.g. 122B, 226) may be dispersed throughout an entire volume of the base material 125 of the respective airborne-charge receiving layers.

In particular, in some examples, the additive material comprises a polyethylene wax. In some examples, the additive material comprises a polytetrafluoroethylene (PTFE)-modified polyethylene wax, such as Lanco TF 1778 available from Lubrizol Advanced Materials, Inc. of Cleveland, Ohio. In some examples, such wax additive material may sometimes be considered micronized particles.

Via this arrangement, the additive wax material may provide good lubrication such that an external object 114 (FIG. 4) may slide smoothly across the first side 31B of the airborne-charge receiving layer. Moreover, chemical contact adhesion may be minimized between an external object 114 (FIG. 4), thereby minimizing triboelectric charge transfer between the external object 114 and the external surface 124 of the base material 125 of the airborne-charge receiving layer.

In some such examples, some particles of the additive wax material 161 may protrude at external surface 124 of the base material 125 in a manner similar to the previously described examples in at least FIGS. 5A-5B, 7.

In some examples, the additive particles forming a suspension (e.g. 74 in FIG. 4A) may comprise micronized particles, which may sometimes be referred to as matting agent. In some examples, the micronized particles may comprise Deuteron® MK type micronized particles available from Deuteron Gmbh of Germany. In some examples, the micronized particles may comprise a material available from Momentive Performance Materials, Inc. of Waterford, N.Y. and sold under the trademark Tospearl®, and available as beads, resins, microspheres, etc.

In some examples, the example micronized particles used as additive particles for reducing triboelectric charge transfer may comprise a low surface energy material such as polytetrafluroethylene (PTFE) material or a silicone material.

In contrast to at least some of the previously described examples of a suspension, in some examples, the additive material forms a solution (e.g. 80 in FIG. 4A) with the base material to inhibit chemical contact adhesion during relative movement between the airborne-charge receiving layer and an external object. In some such examples, the additive material may comprise a volume additive such as a dispersant, while in some such examples, the additive material may comprise a surface active agent.

Figure 8:
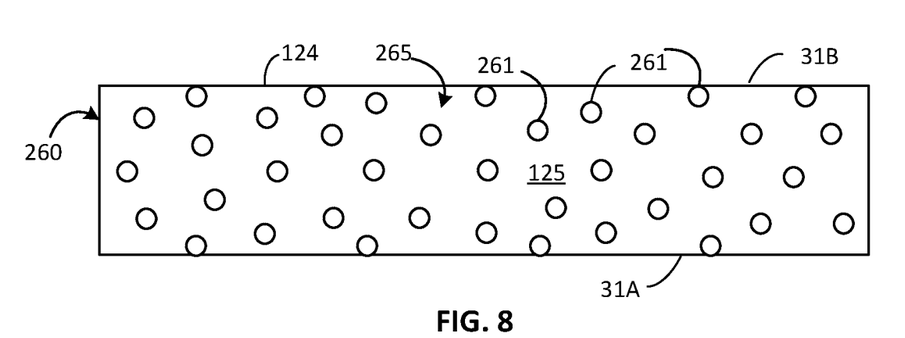

FIG. 8 is a side view schematically representing an example airborne-charge receiving layer 160 of a passive e-paper assembly. In some examples, the airborne-charge receiving layer 160 comprises at least some of substantially the same features and attributes as the previously described airborne-charge receiving layers (e.g. at least 30 in FIGS. 1-3).

In some examples, the additive material for reducing triboelectric charge transfer at airborne-charge receiving layer may comprise a dispersant which forms a solution (e.g. 80 in FIG. 4A). In some instances, such a dispersant may sometimes be referred to as a volume additive (e.g. 84 in FIG. 4A). In one aspect, the term volume additive may refer to the ability of the additive material to change the overall affinity of the airborne-charge receiving layer for electrons via the influence of the additive material on the electronic structure of the airborne-receiving layer. One such example arrangement of a dispersant, which forms a solution with a base material, is shown in FIG. 8, which represents the generally uniform distribution of the additive dispersant material 261, as part of a solution 265, throughout airborne-charge receiving layer 260.

In some examples, the dispersant may comprise a Polyhedral Oligomeric Silsesquioxane material, which is commercially available under the trademark POSS® from Hybrid Plastics, Inc. of Hattiesburg, Miss. In some examples, the dispersant may comprise Trisilanolisooctyl Polyhedral Oligomeric Silsesquioxane (TSI-POSS®).

In some such examples of such dispersants, the airborne-charge receiving layer may comprise a silicone base material and a dispersant additive material, such as the POSS® material. In some such examples, the airborne-charge receiving layer additionally comprises a surface-active agent, such as a silicone acrylate material, which may comprise a commercially available material sold under the trade name Tego® Rad 2500 from Evonik Resource Efficiency GmbH of Essen, Germany. In one aspect, the dispersant additive material may spread throughout the volume of the airborne-receiving layer, such as if the base material comprises a UV acrylate material. In one aspect, the surface-active agent may migrate to the external surface (e.g. 124).

In some examples, as previously described in association with at least FIG. 4A, the additive material comprises a surface-active agent 272, which forms a solution 275 with a base material 125 of an airborne-charge receiving layer 270. In some such examples, such surface-active agent(s) 272 may preferentially congregate near, on, or at a free surface such as an external surface 124 of the base material 125, as shown in the example airborne-charge receiving layer 270 of FIG. 9.

Figure 9:
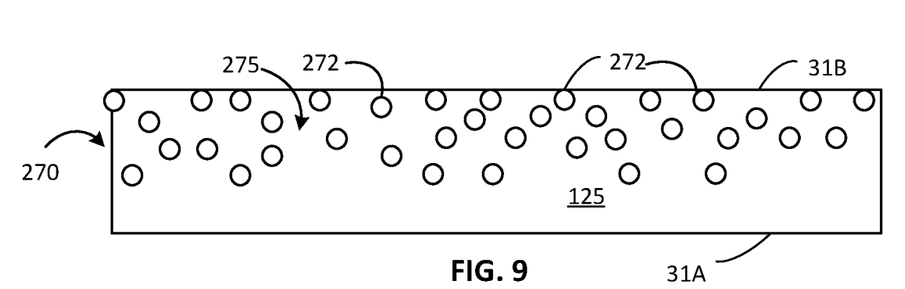

Accordingly, as schematically represented in FIG. 9, in some examples the additive material may comprise a surface-active additive material 272, which forms a solution 275 (at the molecular level) with at least the base material 125 to define airborne-charge receiving layer 270. In one aspect, such surface-active material(s) 272 do not protrude at or from external surface 124 of base material 125. In some such examples, after being added to the base material 125, the additive material 272 will migrate toward, and congregate at, the external surface 124 of base material 125 while the base material 125 is in a liquid phase. Upon solidification resulting from polymerization, in some instances the additive material 272 may continue to migrate if the particular additive material lacks polymerizable groups. However, in some instances in which the additive material 272 includes polymerizable groups, co-polymerization will occur and the additive material will cease migration toward the external surface 124.

Among other features and attributes, the deployment of an additive material as a surface-active agent may result in using a substantially lower volume of additive material 120 (than a non-surface-active additive material) to achieve desired triboelectric reduction properties because the additive material 120 tends to congregate at the first side 31B of the airborne-charge receiving layer at which triboelectric charge transfer is to be minimized or prevented. Moreover, via such arrangements, the additive material can be added with minimal impact on the general overall properties (e.g. electrical, chemical, mechanical) of the airborne-charge receiving layer.

In some examples, when embodied as a surface-active agent, the additive material 272 may comprise a silicone acrylate material. In some examples, the silicone acrylate material comprises a commercially available material sold under the trade name Tego® Rad 2500 from Evonik Resource Efficiency GmbH of Essen, Germany. In some examples, when deployed as an additive material 272, the silicone acrylate material comprises about 0.05 percent to about 1 percent by weight of a total volume of the airborne-charge receiving layer 270. In some examples, when deployed as an additive material 272, the silicone acrylate material comprises about 0.1 percent to about 0.5 percent by weight of a total volume of the airborne-charge receiving layer 270. In some examples, when deployed as an additive material 272, the silicone acrylate material comprises about 0.3 percent by weight of a total volume of the airborne-charge receiving layer 270.

In some examples, the base material 125 of an airborne-charge receiving layer comprises a UV curable acrylate coating, such that when a silicone acrylate is used as an additive, the additive material co-polymerizes with the base material to make the additive material a permanent portion of the airborne-charge receiving layer. As such the enhanced lubricity and reduction in triboelectric charge transfer at the external surface of the airborne-charge receiving layer is permanent in at least some examples.

With further reference to block 90 in FIG. 4B, in some examples, the reduction of triboelectric charge transfer may be implemented via use of the base material 90 comprising at least some types of silicone materials without adding (e.g. omitting) an additive triboelectric-reduction material. In some such examples, the silicone material comprises at least five weight percent of the base material of the airborne-charge receiving layer. In one aspect, such weighting may be considered a change in the base material rather than adding an additive material to change properties at external surface such that the overall properties of the airborne-charge receiving layer (e.g. 112 in FIG. 5A) are modified so as to generally not exhibit triboelectric charge transfer relative to an external object, such as a finger. In some such examples, the reduction in triboelectric charge transfer does not depend on the external object 114 (FIG. 5A) making contact with additive particles (e.g. 76, 78 in FIG. 4A) at the external surface 124 of an airborne-charge receiving layer (e.g. 112 in FIG. 5A), but rather the modified base material itself does not exhibit significant triboelectric charge transfer relative to an external object (e.g. finger).

Accordingly, in some such examples, the first material comprises a silicone material forming at least a majority (e.g. about 51 percent) weight percentage of a base material 42 of the airborne-charge-receiving layer. In some examples, the first material comprises a silicone material forming at least a super majority weight percentage of a base material 42 of the airborne-charge-receiving layer. In some examples, the super majority comprises 67 weight percent, while in some examples, the super majority comprises 80 weight percent.

In some such examples, a parylene material may be used as the base material 90 instead of a silicone material in order to implement a desired lubricity and/or a reduction in triboelectric charge transfer.

FIG. 10 is a diagram 301 including a cross-sectional view schematically representing one example e-paper assembly 300 and a side plan view schematically representing an example imager unit 310. In some examples, e-paper assembly 300 comprises at least some of substantially the same features and attributes of the example e-paper assemblies and/or example airborne-charge receiving layer, as previously described in association with at least FIGS. 1-9.

As shown in FIG. 10, e-paper assembly 300 comprises an airborne-charge receiving layer 30 and charge-responsive media layer 334, with similar reference numerals referring to like elements in FIGS. 1-9. In some examples, charge-responsive media layer 334 of e-paper assembly 300 provides one example implementation for a charge-responsive media layer 34 of an e-paper assembly as previously described and illustrated with reference to at least FIGS. 1-9.

In some examples, the external surface 55 of counter electrode layer 52 comprises a viewing side 25B of the e-paper assembly 300 as represented by the directional arrow V1. Meanwhile, external surface 31B of airborne-charge receiving layer 30 provides the surface at which airborne charges are applied (e.g. an imaging surface) for e-paper assembly 300.

As shown in FIG. 10, in some examples the charge-responsive media layer 334 includes microcapsules 308 encapsulated by a resin or polymer 314. In one example, each microcapsule 308 includes black particles 310 and white particles 312 suspended in a fluid medium 316.

In some examples, when held in a viewing position, ambient light is transmitted through a transparent (or translucent) counter electrode layer 52, strikes microcapsules 308, and is reflected back to the viewer V1. In instances in which white particles 312 of a microcapsule 308 are located near counter electrode layer 52, the respective microcapsule 308 appears white to a viewer V1. However, when black particles 310 of a microcapsule 308 are located near counter electrode layer 52, the respective microcapsule 308 appears black to the viewer V1. The particles 310 and 312 have opposite charges. For example, black particles 310 can be positively charged particles, and white particles 312 can be negatively charged particles, such that when ions (e.g. positive or negative charges) are written to the charge-responsive media layer 334, the respective particles 310, 312 respond according to the respective attractive or repelling forces. Various shades of gray can be created by varying the arrangement of alternating microcapsules with white and black particles located near counter electrode layer 52 to produce halftoning.

With this in mind, as further shown in FIG. 10, an imager unit 310 comprises an erasing head 312 and a writing head 314. In some examples, the respective heads 312, 314 may comprise an ion-based technology, which generates charges from a corona and emits the charges, via an individually addressable electrode array, in a selectable pattern toward the airborne-charge receiving layer 30. In some examples, other energy sources may be used to generate the ions, e.g. positive and/or negative charges.

The imager unit 310 and e-paper assembly 300 are arranged for relative movement to each other. For instance, the e-paper assembly 300 may be movable relative to a fixed imager unit 310 or the imager unit 310 may be movable relative to an e-paper assembly 300 in a temporarily fixed position. The imager unit 310 is spaced apart from the external surface 31B of airborne-charge receiving layer 30, such that charges emitted from imager unit 310 travel airborne to first side 31B of airborne-charge responsive layer 30. In the particular example shown in FIG. 10, the imager unit 310 is shown moving in direction A (when e-paper assembly 300 is fixed) or the e-paper assembly 300 media is shown moving in direction B (when imager unit 310 is fixed). During such relative movement, in some examples the erasing head 312 emits a plurality 318 of negative charges 319 onto airborne-charge receiving layer 30 to erase any prior image held by the media layer 334. Then the writing head (W) 314 emits a plurality 316 of positive charges 317 in a selectable pattern (e.g. via an addressable electrode array) onto airborne-charge receiving layer 30. In general, a sufficient number of the charges 317 migrate through the airborne-charge receiving layer 30 such that the charges affect the distribution of the black and white particles 310, 312 within microcapsules 308 at selected positions of an array of microcapsules. In the example shown, because the black particles 310 are positively charged, they are repelled away from the positive charges applied at airborne-charge receiving layer 30 while the white particles 312 (which are negatively charged) are attracted to the positive charges applied to the airborne-charge receiving layer 30. As a result, the black particles 310 in the selected microcapsules 308 form an image viewable from side 25B, as represented by the directional arrow V1.

In some examples, as represented by the directional arrow V2, the surface 31B at the airborne-charge receiving layer 30 may comprise the viewing surface/side of the e-paper assembly 300. Accordingly, in such examples, the airborne-charge receiving layer 30 comprises both the imaging side of the e-paper assembly 300 and the viewing side of the e-paper assembly 300.

In some examples, the black particles 310 can be negatively charged particles, and white particles 312 can be positively charged particles. In some such examples, the polarity of the respective erasing and writing heads 312, 314 of the imaging unit 310 may be reversed.

Microcapsules 308 exhibit image stability using chemical adhesion between particles and/or between the particles and the microcapsule surface. For example, microcapsules 308 can hold text and images indefinitely without using electricity, while allowing the text or images to be changed later.

In some examples, the diameter of each microcapsule 308 is substantially constant within layer 334 and can be in one example between 20 μm and 100 μm, such as 50 μm. In some examples, at least a portion of counter electrode layer 52 can be composed of a transparent conductive material, such as indium tin oxide, or an opaque material.

E-paper assembly 300 may have a variety of other configurations. In some examples, each microcapsule 308 may include black particles suspended in a white colored fluid. The black particles can be positively charged particles or negatively charged particles. One or more microcapsules form a pixel of black and white images displayed on e-paper assembly 300. The black and white images are created by placing black particles near or away from counter electrode layer 52 (when surface 55 is the viewing side—V1) or from charge receiving layer 30 (when surface 31B is the viewing side—V2). For example, microcapsules 308 having black particles 310 located away from counter electrode layer 52 reflect white light, corresponding to a white portion of an image displayed on e-paper assembly 300 as viewable on a first viewing side V1. In contrast, the microcapsules with black particles located near counter electrode layer 52 appear black to a viewer V1 corresponding to a black portion of the image displayed on e-paper display 300. Various shades of gray can be created by using halftoning with black particles located near or away from counter electrode layer 52.

Figure 11:
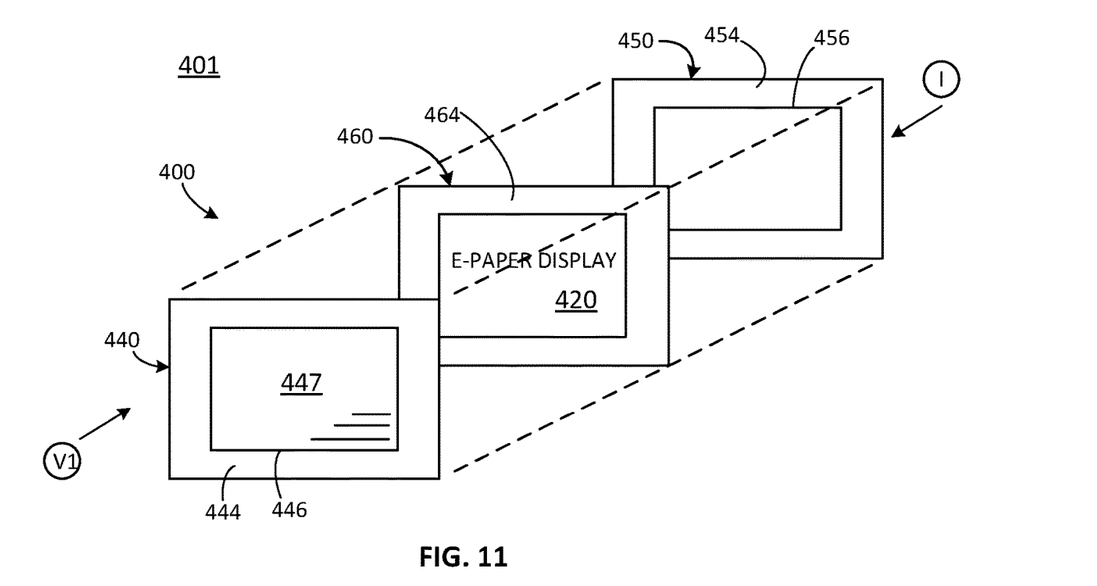
FIG. 11 is an exploded view schematically representing an example passive e-paper display media.

FIG. 11 is a diagram 401 including an exploded view schematically representing an example a passive e-paper display device 400. As shown in FIG. 11, in some examples display device 400 may comprise support members 440, 450, 460 which are formed about and/or secured relative to an e-paper display 420 (e.g. e-paper assembly 20 in FIG. 1, 40 in FIG. 2, 50 in FIG. 3, 300 in FIG. 10). In some examples, in a manner consistent with at least some of the previously described examples in FIGS. 1-10, e-paper display 420 may comprise an airborne-charge receiving layer (e.g. 30, 112, etc.) which reduces triboelectric charge transfer relative an external object 114 (FIG. 5A), which in turn reduces unintentional switching of color particles in a charge-responsive media layer (e.g. 34 in FIGS. 1-3, 334 in FIG. 10).

In one aspect, such arrangements may facilitate the passive e-paper display 420 to function as a gift card, employee badge, display card, transaction medium, etc. In some examples, one support member 460 comprises a frame 464 formed about and/or on the edges of the passive e-paper display 420. In some examples, support member 460 may be further sandwiched between a first outer support member 440 and a second outer support member 450, as shown in FIG. 11. The first outer support member 440 comprises a frame 444 defining a window 446 holding a transparent member 447 through which the passive e-paper display 420 is visible and viewable as represented via indicator V1. The second outer support member 450 comprises a frame 454 defining a window 456 through which an airborne-charge receiving layer (e.g. 30 in FIGS. 1-3, 10 and 112, 130, 140, 150, 160, 170 in FIGS. 4-9) of the passive e-paper display 420 will be accessible for imaging via an imager unit (e.g. 310 in FIG. 10), as represented via indicator I.

Upon securing the respective support members 440, 460, 450 relative to each other, a single e-paper display device 400 provides a relatively thin, flexible e-paper display media which may enable robust use and handling in a wide variety of conditions while retaining high quality images on e-paper display 420. The e-paper display device 400 is configured to cooperate with an imager unit (e.g. 310 in FIG. 10) while still being usable and handled like any common gift card, identification card, access badge, etc. As such, the e-paper display device 400 is highly flexible, thin, light and resistant to wear, impact, etc.

Figure 12:
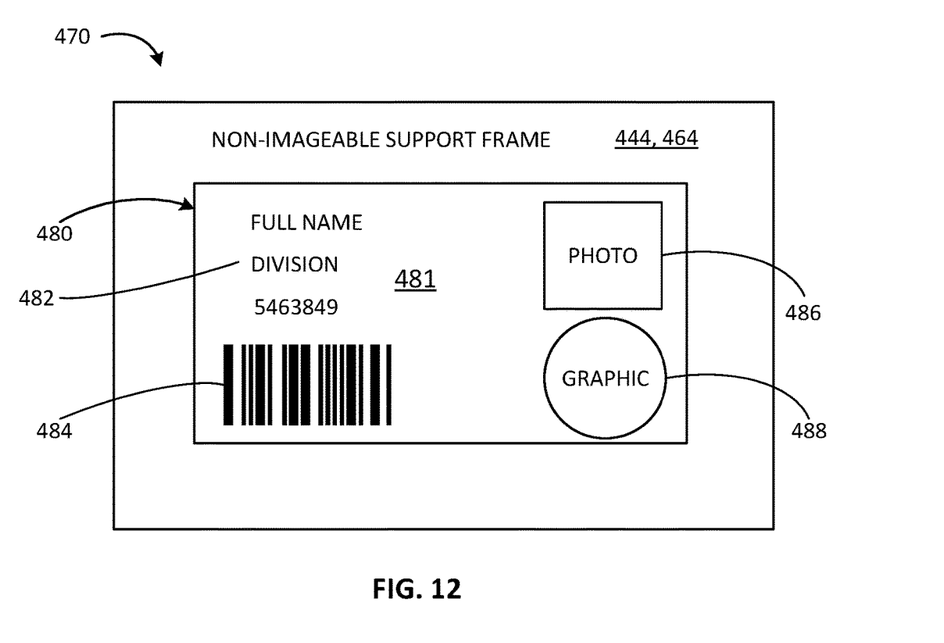
FIG. 12 is top plan view schematically representing an example passive e-paper display media.

FIG. 12 is top plan view schematically representing an example e-paper display device 470. In some examples, the e-paper display device 470 comprises an e-paper assembly 480 supported via support frame (e.g. 444 and/or 464 in FIG.

11). In some examples, e-paper assembly 480 comprises at least some of substantially the same features and attributes as the example e-paper assemblies, as previously described in association with at least FIGS. 1-11. Accordingly, in some examples, e-paper assembly 480 may comprise an airborne-charge receiving layer (e.g. 30, 112, etc.) which reduces triboelectric charge transfer relative an external object 114 (FIG. 5A), which in turn reduces unintentional switching of color particles in a charge-responsive media layer (e.g. 34 in FIGS. 1-3, 334 in FIG. 10).

As represented in FIG. 12, the support frame is a non-imageable support frame in that it does not embody re-writing images in the manner previously described for the example e-paper assemblies. However, this does not preclude support frame (e.g. 444) from bearing images (e.g. text, graphics, photos) printed via non-e-paper technologies.

FIG. 12 also schematically represents at least some of the types of information which can form part of an image 481 on an e-paper assembly 480. For instance, image 481 may comprise text 482, such as alphanumeric expressions like names, numbers, etc. In some instances, image 481 may comprise machine readable markings 484, such as a bar code or QR code. In some instances, image 481 may comprise a photo 486 and/or a graphic 488.

It will be understood that in some instances, it may be desirable to retain such information in image 481 in a clear, accurate manner for an extended period of time. Hence, it will be apparent that the introduction of the previously described triboelectric-reduction materials in the examples of airborne-charge receiving layer may play a significant role in quality image retention, which in turn may enhance accuracy and readability of the information displayed. This performance, in turn, may contribute to the widespread, robust use of such passive e-paper media.

Figure 13:
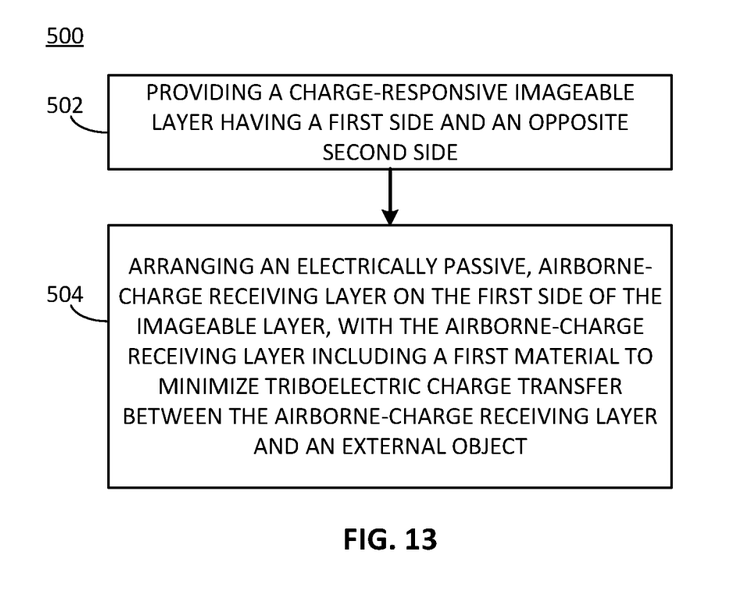
FIG. 13 is a flow diagram schematically representing an example method of manufacturing a passive e-paper assembly.

FIG. 13 is a flow diagram schematically representing an example method 500 of manufacturing. In some examples, method 500 may be performed via the assemblies, layers, structures, etc. as previously described in association with at least FIGS. 1-12. In some examples, method 500 may be performed via assemblies, layers, structures, etc. other than those previously described in association with at least FIGS. 1-12.

As shown at 502 in FIG. 13, method 500 comprises providing a charge-responsive imageable layer having a first side and an opposite second side. At 504, method 500 comprises arranging an electrically passive, airborne-charge receiving layer on the first side of the imageable layer, with the airborne-charge receiving layer including a first material to minimize triboelectric charge transfer between the airborne-charge receiving layer and an external object.

In some examples, method 500 comprises arranging a counter electrode layer on the second side of the imageable layer.

In some examples, charges are emitted by an imager unit (e.g. 310 in FIG. 10) spaced apart from the airborne-charge receiving layer, with such airborne charges being received by the airborne-charge receiving layer and through which the charges migrate to the charge-responsive media layer.

In addition, in some examples, the method 500 of manufacturing may incorporate at least some of the feature and attributes of the assemblies, layers, structures, barriers, etc. as previously described in association with at least FIGS. 1-12. For instance, some examples of a method of manufacturing of a passive e-paper assembly may comprise the features and attributes of the materials and/or methods of forming an airborne-charge receiving layer having triboelectric charge reduction properties as previously described in association with at least FIGS. 4A-9.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An airborne-charge-receiving layer of a passive electronic paper assembly, the charge-receiving layer comprising a first side and opposite second side to be in contact with a charge-responsive media layer, wherein the charge-receiving layer comprises a base material having a volume that comprises a majority of a volume of the charge-receiving layer and an additive material to reduce triboelectric charge transfer at an external surface of the first side,
wherein a volume of the additive material relative to the volume of the base material is based at least on one of a surface roughness of the base material, a type of the base material and a composition of the base material.

2. The charge-receiving layer of claim 1, wherein the additive material forms a suspension within the base material in which at least one of:
at least some of a plurality of particles of the additive material protrude from an external surface of the first side of the airborne-charge-receiving layer; and
at least some of the particles of the additive material are exposed at, but generally do not protrude from, the external surface of the first side of the airborne-charge-receiving layer.

3. The airborne-charge-receiving layer of claim 2, wherein the additive material comprises at least one of a wax and micronized particles.

4. The airborne-charge-receiving layer of claim 1, wherein the additive material forms a solution with the base material to minimize chemical contact adhesion during relative movement between the charge-receiving layer and an external object.

5. The airborne-charge-receiving layer of claim 4, wherein the additive material comprises at least one of a surface-active agent and a dispersant.

6. A passive electronic paper assembly comprising:
a charge-responsive media layer including a first side and an opposite second side;
a counter electrode layer disposed on the second side of the charge-responsive media layer; and
an airborne-charge receiving layer including a first side and an opposite second side in contact with the first side of the charge-responsive media layer, the airborne-charge receiving layer comprising a first material to minimize triboelectric charge transfer during relative sliding contact between an external object and the airborne-charge receiving layer, wherein a volume of the first material relative to a volume of a base material of the charge receiving layer is based at least on one of a surface roughness of the base material, a type of the base material and a composition of the base material.

7. The passive electronic paper assembly of claim 6, wherein the first material comprises at least one of a silicone material and a parylene material and the airborne-charge receiving layer omits an additive triboelectric-reduction material.

8. The passive electronic paper assembly of claim 6, wherein the first material of the airborne-charge receiving layer comprises a triboelectric charge transfer barrier at least partially exposed at an external surface of the first side of the charge-receiving layer.

9. The passive electronic paper assembly of claim 8, wherein the first material comprises an additive material which acts as a suspension within the base material of the airborne-charge-receiving layer.

10. The passive electronic paper assembly of claim 9, wherein at least some particles of the first material protrude from a surface of the base material composition at the first side of the airborne-charge receiving layer, and wherein the first material comprises an average particle size larger than the surface roughness of the base material.

11. The passive electronic paper assembly of claim 9, wherein at least some of a plurality of particles of the additive material are exposed at, but generally do not protrude from, an external surface of the first side of the airborne-charge-receiving layer.

12. The passive electronic paper assembly of claim 9, wherein the airborne-charge receiving layer comprises a triboelectric-reduction additive material forming no more than 5 percent volume of a total volume of a material composition of the airborne-charge-receiving layer.

13. A method of manufacturing an electronic paper assembly comprising:
providing a charge-responsive imageable layer having a first side and an opposite second side; and
arranging an electrically passive, airborne-charge receiving layer on the first side of the imageable layer, the airborne-charge receiving layer including a base material and an additive material to minimize triboelectric charge transfer between the airborne-charge-receiving layer and an external object slidably movable relative to the airborne-charge receiving layer, wherein a volume of the additive material relative to a volume of the base material is based at least on one of a surface roughness of the base material, a type of the base material and a composition of the base material.

14. The method of claim 13, wherein arranging the airborne-charge receiving layer comprises:
forming a suspension of the additive material within the base material in which at least some of a plurality of particles of the additive material protrude from an external surface of the first side of the airborne-charge-receiving layer.

15. The method of claim 13, wherein arranging the airborne-charge-receiving layer comprises:
forming a solution with the base material and the additive material to minimize chemical contact adhesion during relative contact movement between the airborne-charge-receiving layer and an external object.

* * * * *